United States Patent [19]
Monahan

[11] Patent Number: 5,872,595
[45] Date of Patent: Feb. 16, 1999

[54] METHODS AND APPARATUS FOR PROVIDING WIDE RANGE EXPOSURE CONTROL FOR IMAGE INTENSIFIER CAMERAS

[76] Inventor: John F. Monahan, 12 Gull Hill Rd., Northport, N.Y. 11768

[21] Appl. No.: 515,960

[22] Filed: Aug. 16, 1995

[51] Int. Cl.$^6$ .......................... H04N 5/225; H04N 5/238
[52] U.S. Cl. .......................... 348/217; 348/229; 348/364; 250/208.1
[58] Field of Search .................... 348/216, 217, 348/229, 230, 362, 363, 364, 207, 222; 250/208.1; H04N 5/225, 5/238

[56] References Cited

U.S. PATENT DOCUMENTS

| | | | |
|---|---|---|---|
| 3,848,085 | 11/1974 | Van Atta | 348/217 |
| 4,050,085 | 9/1977 | Prince et al. | 348/217 |
| 4,202,014 | 5/1980 | Gilligan et al. | 348/362 |
| 4,541,016 | 9/1985 | Ochi et al. | 348/230 |
| 4,851,914 | 7/1989 | Pfanhouser et al. | 348/217 |
| 4,872,057 | 10/1989 | Woolfolk | 348/217 |
| 4,918,534 | 4/1990 | Lam et al. | 348/367 |
| 4,985,773 | 1/1991 | Gilligan et al. | 348/217 |
| 5,101,275 | 3/1992 | Wijnen | 348/229 |
| 5,140,424 | 8/1992 | Yoshimura et al. | 348/620 |
| 5,168,532 | 12/1992 | Seppi et al. | 382/270 |
| 5,233,428 | 8/1993 | Alford et al. | 348/230 |
| 5,258,848 | 11/1993 | Kondo et al. | 348/229 |

Primary Examiner—Wendy Garber
Assistant Examiner—Ngoc-Yen Vu
Attorney, Agent, or Firm—Joseph J. Kaliko

[57] ABSTRACT

The dynamic range of an image intensifier camera may be extended by using an automatic exposure control system which, in response to imager output (for example, the output of a charge coupled device (CCD) imager included in a solid state image intensifier camera), (a) generates a first control signal that controls the gain of the I$^2$ Tube itself; (b) generates a second control signal for selectively gating the I$^2$ Tube on or off; and (c) generates a third control signal for controlling a light attenuator that, according to a preferred embodiment of the invention, is included in the camera. The automatic exposure control system contemplated by the invention has a control range in excess of $10^{10}$x; takes a measurement of the exposure from an imager (again, for example, a CCD sensor) for comparison to a desired setpoint; the measurement used may be a peak, an average or some weighted function and the automatic exposure control logic then adjusts, in order, the I$^2$ Tube gain, the I$^2$ Tube gating and the light attenuator (using the aforementioned first, second and third control signals), to adjust for steadily increasing light from the object under observation. In addition to automatic exposure control systems per se, the invention is also directed to camera systems which incorporate such automatic exposure control systems and to methods for realizing the automatic exposure control systems of the type described hereinafter.

44 Claims, 4 Drawing Sheets

METHODS AND APPARATUS FOR PROVIDING WIDE RANGE EXPOSURE CONTROL FOR IMAGE INTENSIFIER CAMERAS

BACKGROUND OF THE INVENTION

1. Field of the Invention

The invention relates generally to imaging systems or cameras (such as video cameras), and exposure control systems for such systems/cameras.

More particularly, the invention relates to image intensifier cameras (cameras that includes an Image Intensifier Tube, referred to hereinafter as an "$I^2$ Tube"), and automatic exposure control systems for such cameras.

According to one aspect of the invention, the dynamic range of an image intensifier camera may be extended by using an automatic exposure control system which, in response to imager output (for example, the output of a charge coupled device (CCD) imager included in a solid state image intensifier camera), (a) generates a first control signal that controls the gain of the $I^2$ Tube itself; (b) generates a second control signal for selectively gating the $I^2$ Tube on or off; and (c) generates a third control signal for controlling a light attenuator that, according to a preferred embodiment of the invention, is included in the camera. The automatic exposure control system contemplated by the invention has a control range in excess of $10^{10}\times$.

According to a further aspect of the invention, the automatic exposure control system takes a measurement of the exposure from an imager (again, for example, a CCD sensor) and digitizes it for comparison to a desired setpoint. The measurement used may be a peak, an average or some weighted function. The automatic exposure control logic then adjusts, in order, the $I^2$ Tube gain, the $I^2$ Tube gating and the light attenuator (using the aforementioned first, second and third control signals), to adjust for steadily increasing light from the object under observation.

In addition to automatic exposure control systems per se, the invention is also directed to camera systems which incorporate such automatic exposure control systems and to methods for realizing the automatic exposure control systems of the type described hereinafter.

2. Brief Description of the Prior Art

A variety of automatic light control systems for imaging/camera systems are well known in the prior art. In addition, a wide variety such systems that utilize image intensifiers (such as an $I^2$ Tube) and/or solid state imagers (such as a CCD imager) are also well known.

These systems have many applications, including television camera systems, navigational and tracking systems, etc. For many of these systems it is desirable to have a wide dynamic range of performance which permits system operation over a wide range of changing light conditions, ranging from very low light conditions (e.g., systems which operate at night), to high intensity light conditions.

Several patents are briefly described hereinafter for background purposes and to illustrate the state of the prior art.

Prince et al., in U.S. Pat. No. 4,050,085, describes a mechanical system for automatically regulating light input to an electro-optical imaging system used in tracking and navigational systems. According to Prince et al., light measurements, that include peak, average and weighted measurements, are taken and used for controlling an $I^2$ Tube, a vidicon with adjustable gain, a mechanical iris controller and a number of amplifiers.

Gilligan et al., in U.S. Pat. No. 4,202,014, describes a pulse modulated automatic light control system for a television camera.

The use of CCD or solid state imaging devices in place of film in cameras is described in Ochi et al., U.S. Pat. No. 4,541,016. A further example of a prior art CCD or solid state imaging device is disclosed in U.S. Pat. No. 4,851,914, to Pfanhouser et al., which describes a high speed full frame imaging CCD camera.

Woolfolk, in U.S. Pat. No. 4,872,057, describes an exposure control system for a TV camera which uses a gated $I^2$ Tube to enable low light television systems to be used over a wide dynamic range of light input.

Lam et al., in U.S. Pat. No. 4,918,534, describes an image processing system which includes an $I^2$ Tube, an LCD attenuator, a TV camera and a brightness control circuit which controls the attenuator.

Gilligan et al., in U.S. Pat. No. 4,985,773, discloses an exposure control system for a TV camera which includes an $I^2$ Tube controlled using an amplitude adjustable, periodically pulsed signal.

Wijen, in U.S. Pat. No. 5,101,275, describes a video camera with light intensity control means including an adjustable light attenuating liquid crystal plate.

Yoshimura et al., in U.S. Pat. No. 5,140,424, describes a solid state video camera (CCD based) that includes noise reduction signal processing apparatus.

Seppi et. al., in U.S. Pat. No. 5,168,532 describes a method for improving the dynamic range of an X-ray camera which includes an IIT. The video signal is digitized for further processing in the control circuitry.

Alford et al., in U.S. Pat. No. 5,233,428, hereby incorporated by reference, discusses (in the "Related Art" section of this reference) the use of CCDs in camera images to enable the production of smaller and more durable camera imagers; the effort spent on developing exposure control systems for effectively controlling imager sensitivity to incident light on the imager (that is, controlling the amount of charge a CCD accumulates during a field integration period); prior art exposure control systems which relied on (i.e., are implemented using) mechanical devices (such as a mechanical iris/or mechanical shutter wheel, etc.); relatively large vacuum tube type imagers; on chip shuttering options which allow accumulated charge in the charge storage wells of a CCD to be dumped before the end of a normal integration period, etc.

In addition to the outlining of systems exemplifying the state of the art, the incorporated reference discloses a high performance exposure control system for effectively controlling CCD light sensitivity under varying light conditions. In particular, the Alford et al. reference teaches controlling CCD light sensitivity by electrically controlling a CCD such that the CCD discharges the charge resultant from incident light for a percentage of a field integration period. In other words, the incorporated reference electronically varies the CCD's exposure time.

The technique proposed by Alford, et al. for controlling exposure in their solid state imager, namely electronically controlling CCD exposure time directly, has a potentially negative impact on imager tube life (for example, $I^2$ Tube life), which is a major contributor to imager failure rates. The failure mechanism of these devices is associated with the average current, which is not held constant by Alford at al., and similar systems.

Furthermore, the use of tube current for exposure level detection does not lend itself towards tailoring the exposure control loop to various applications in which it may be desirable to emphasize, de-emphasize or even ignore portions of a scene contributing to a desired exposure level.

Still further, none of the exemplary prior art discussed hereinbefore provides a wide range exposure control mechanism for image intensifier cameras, where wide range is defined as a control range in excess of $10^{10}\times$.

Accordingly, it would be desirable to provide image intensifier cameras having a wide dynamic range of performance which permits system operation over a wide range of changing light conditions, ranging from very low light conditions (e.g., systems which operate at night), to high intensity light conditions.

In particular, it would be desirable to provide methods and apparatus for being able to extend the dynamic range of image intensifier cameras to a control range in excess of $10^{10}\times$.

Furthermore, it would be desirable to provide methods and apparatus for controlling the dynamic range of image intensifier cameras, in particular those cameras utilizing $I^2$ Tubes, which prolong tube life by directly controlling the image intensifier tube itself (as opposed to controlling, for example, CCD exposure time as performed by Alford et al.).

Still further, it would be desirable to provide methods and apparatus for controlling the dynamic range of image intensifier cameras which allows the response of the exposure control loop to be tailored to various applications in order, for example, to allow specific parts of the scene can be emphasized, de-emphasized or ignored totally as they contribute to the desired exposure level.

SUMMARY OF THE INVENTION

Accordingly, it is a general object of the invention to provide an image intensifier camera having a wide dynamic range of performance which permits system operation over a wide range of changing light conditions, ranging from very low light conditions (e.g., systems which operate at night), to high intensity light conditions.

In particular, it is an object of the invention to an automatic exposure control system (and related methods and apparatus) that is able to extend the dynamic range of image intensifier cameras to a control range in excess of $10^{10}\times$.

Furthermore, it is an object of the invention to provide methods and apparatus for controlling the dynamic range of image intensifier cameras, in particular those cameras utilizing $I^2$ Tubes, which prolong tube life.

Still further, it is an object of the invention to provide methods and apparatus for controlling the dynamic range of image intensifier cameras which allows the response of the exposure control loop to be tailored to various applications.

According to one aspect of the invention, an image intensifier camera system, together with an automatic exposure control system for the camera system, are disclosed which includes a number of discretely controllable components, each of which is capable of operation over some dynamic range. The exposure control system of the camera essentially gangs these together to obtain an overall dynamic range which is the sum of each component's dynamic range.

According to one embodiment of the invention, the camera includes a lens with a selectively attenuating filter, an $I^2$ Tube which is adjustable for gain through a Micro Channel Plate (MCP) voltage and through gating of the $I^2$ Tube in time, and a CCD image sensor which has adjustable gain. The control system takes a measurement of the exposure from the CCD sensor for comparison to a desired setpoint. The measurement used may be a peak, an average or some weighted function. Exposure control logic then adjusts, in order, the $I^2$ Tube gain, the $I^2$ Tube gating and the light attenuator, to adjust for steadily increasing light from the object under observation.

According to a further aspect of the invention, the dynamic range of an image intensifier camera may be extended by using an automatic exposure control system which, in response to imager output (for example, the output of a charge coupled device (CCD) imager included in a solid state image intensifier camera), (a) generates a first control signal that controls the gain of the $I^2$ Tube itself; (b) generates a second control signal for selectively gating the $I^2$ Tube on or off; and (c) generates a third control signal for controlling a light attenuator that, according to a preferred embodiment of the invention, is included in the camera. The automatic exposure control system contemplated by the invention has a control range in excess of $10^{10}\times$.

According to yet another aspect of the invention, the automatic exposure control system takes a measurement of the exposure from an imager (again, for example, a CCD sensor) for comparison to a desired setpoint. Again, the measurement used may be a peak, an average or some weighted function. The automatic exposure control logic then adjusts, in order, the $I^2$ Tube gain, the $I^2$ Tube gating and the light attenuator (using the aforementioned first, second and third control signals), to adjust for steadily increasing light from the object under observation.

In addition to automatic exposure control systems per se, the invention is also directed to camera systems which incorporate such automatic exposure control systems and to methods for realizing the automatic exposure control systems of the type described hereinafter.

The invention features automatic exposure control systems per se and image intensifier cameras including such control systems, having a control range in excess of $10^{10}\times$.

Furthermore, the invention features image intensifier cameras having a wide dynamic range of performance which permit system operation over a wide range of changing light conditions, ranging from very low light conditions to high intensity light conditions, while preserving tube life and allowing the response of the exposure control loop to be tailored to various applications.

These and other objects, embodiments and features of the present invention and the manner of obtaining them will become apparent to those skilled in the art, and the invention itself will be best understood by reference to the following Detailed Description read in conjunction with the accompanying Drawing.

DETAILED DESCRIPTION

Figure 1:
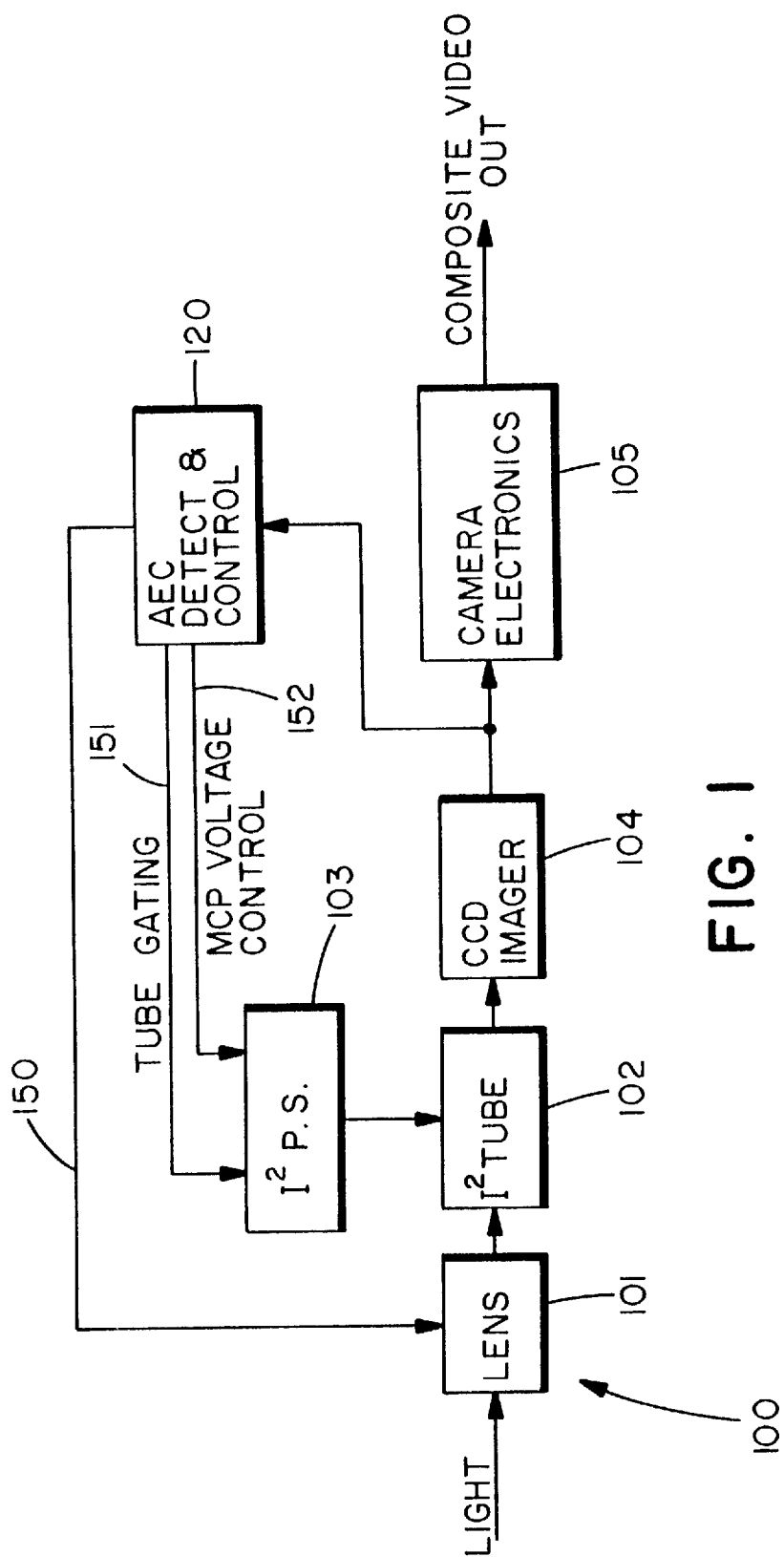
FIG. 1 is a high level block diagram depicting an image intensifier camera, including automatic exposure control (AEC) Detect and Control Logic (also referred to herein as an "automatic exposure control system") of the type contemplated by a preferred embodiment of the invention.

Reference should now be made to FIG. 1 which, as indicated hereinbefore, is a high level block diagram depicting image intensifier camera (camera system 100), including an automatic exposure control system (control system 120) of the type contemplated by a preferred embodiment of the invention.

More particularly, exemplary camera system 100 is shown in FIG. 1 to include lens 101; $I^2$ Tube 102, a gateable high voltage power supply (power supply 103) to operate $I^2$ Tube 102; a video camera, shown by way of example to be CCD imager 104; prior art camera electronics 105; and the aforementioned control system 120 contemplated by the invention.

An exemplary automatic exposure control system 120 for an image intensifier camera, like camera 100, having a control range in excess of $10^{10}\times$ (in accordance with the objects of the present invention) will be described hereinafter with reference to FIG. 2.

Camera system 100 depicted in FIG. 1 operates as follows: Light enters lens 101 and is focused by the lens onto $I^2$ Tube 102. According to a preferred embodiment of the invention, lens 101 includes an integrated neutral density filter (not shown) for attenuating light, which may be switchably placed in the path of the input light.

Lens 101 and $I^2$ Tube 102 are both commercially available devices well known by those skilled in the art.

As will readily be appreciated by those skilled in the art, the functions of the preferred lens 101 (including the integrated filter), may be performed by other arrangements, such as the combination of a separate commercially available lens and a separate light attenuation device which could, for example, be switchably placed and removed from a position in front of the lens using a selenoid switch.

As shown in FIG. 1, $I^2$ Tube 102 has associated therewith gateable power supply 103 (also a commercially available device) which is shown controlled, along with whatever light attenuation device is used to implement the perferred embodiment of the invention, by the aforementioned control system 120 via control links 150, 151 and 152. As depicted in the illustrative embodiment of the invention shown in FIG. 1, link 150 is used to control switching the light attenuator into the light path; and links 151 and 152 are used to control tube gating and MCP voltage respectively as will be described in detail hereinafter.

Light focused onto $I^2$ Tube 102 is amplified by the $I^2$ Tube 102 in a manner well known by those skilled in the art. In accordance with one aspect of the invention, the gain of $I^2$ Tube 102 may controlled by changing the Micro Channel Plate (MCP) Voltage associated with power supply 103, as a function of CCD Imager 104 output as processed by control system 120. This too will be explained in detail hereinafter.

It should be noted that (1) the range of control of the image intensifier camera 100 that can be effected by changing the MCP Voltage associated with power supply 103 is greater then $10^2\times$; and that (2) $I^2$ Tube 102 may be turned ON and OFF by gating the Cathode via gated power supply 103 to further extend the dynamic range of camera 100.

According to the illustrative embodiment of the invention being set forth with reference to FIG. 1, CCD 104 (the video camera used in a preferred embodiment of the invention) produces its' signal by integrating the light output from $I^2$ Tube 102 for the period of one video field. Gating $I^2$ Tube 102 off for part of this period, reduces the signal produced by CCD 104.

It should be noted that camera electronics 105 depicted in FIG. 1 is shown for the sake of completeness only and does not constitute a part of the automatic control system contemplated by the invention. Those skilled in the art will readily appreciate that such electronics are used, for example, to make gamma corrections, add synchronization and blanking signals, etc., to the video camera (CCD 104) output signal, to form a camera 101 composite video output signal as shown in FIG. 1.

Figure 2:
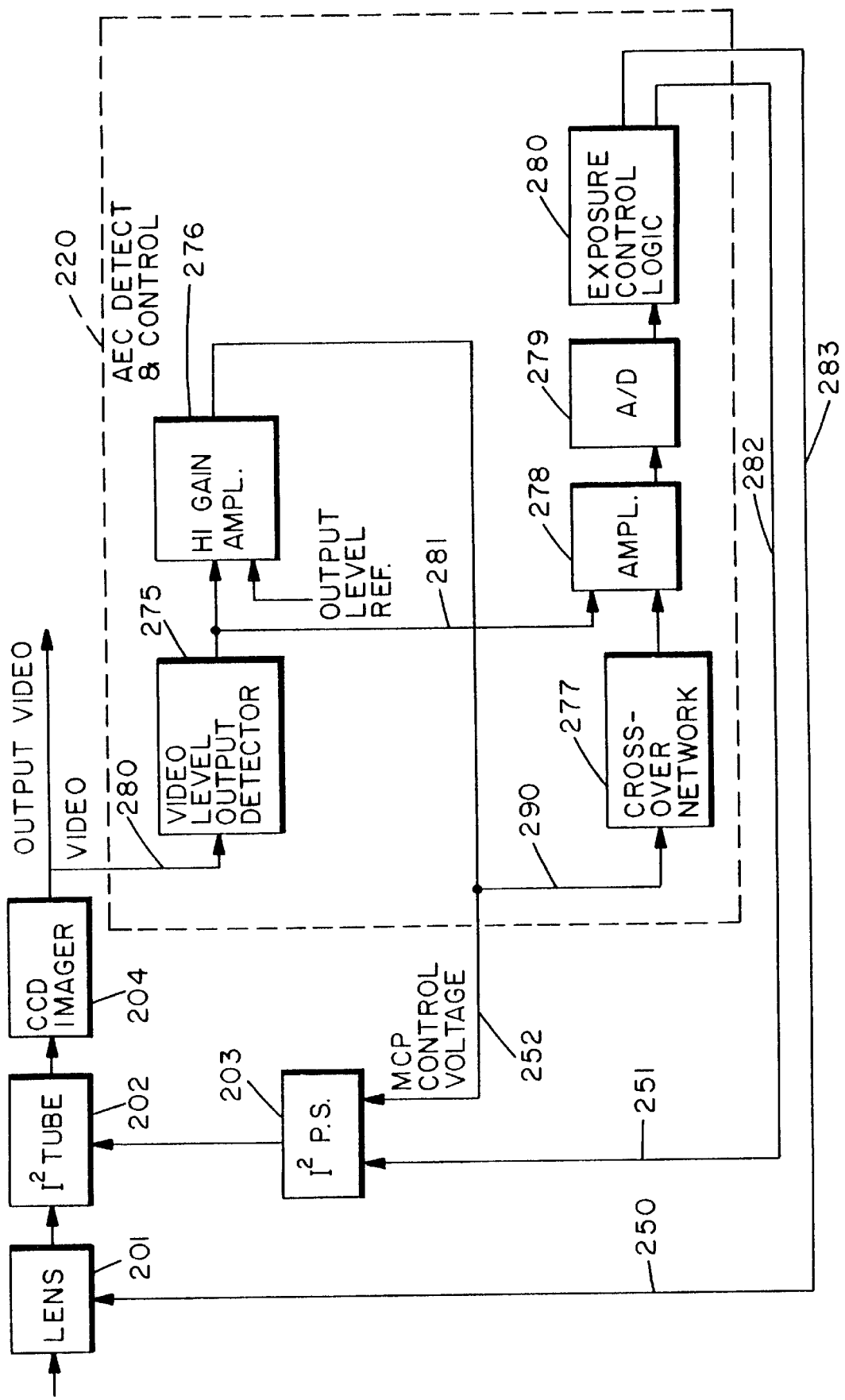
FIG. 2 is a detailed block diagram showing exemplary components for implementing the automatic exposure control system depicted in FIG. 1 which, in accordance with a preferred embodiment of the invention, may be used to realize the objects of the invention.

Reference should now be made to FIG. 2 which, as indicated hereinbefore, is a detailed block diagram showing exemplary components for implementing control system 120 depicted in FIG. 1 and which, in accordance with a preferred embodiment of the invention, may be used to realize the objects of the invention.

In particular, FIG. 2 depicts lens 201, $I^2$ Tube 202, power supply 203, CCD imager 204, control system 220 and links 250–252; all of which correspond to devices 101–104, control system 120 and links 150–152, respectively, described hereinabove with reference to FIG. 1.

In addition, FIG. 2 depicts the following components: video level output detector 275, first amplifier means 276, crossover network 277, second amplifier means 278, analog to digital (A/D) converter 279 and exposure control logic 280.

The operating principals of the invention may now be demonstrat ed with reference to FIG. 2.

The MCP Voltage (for power supply 203) is, according to one aspect of the invention, controlled by a straight forward automatic level control circuit that includes video level output detector 275 and first amplifier means 276 (shown in FIG. 2 as a high gain amplifier).

The amplitude of the video signal input to control system 220 (via link 280 from CCD 204 as shown in FIG. 2) is converted to a dc value by detector 275. This detector may be designed by those of ordinary skill in the art to respond to the average, the peak, or some weighted peak function of the video signal input via link 280 from CCD 204.

The dc produced by detector 275 is, according to a further aspect of the invention, compared to a reference and the difference is amplified by first amplifier means 276. the output of first amplifier means 276, shown on link 252, is a first control signal which may be used to directly control the intensifier MCP Voltage and therefore its gain.

The output of detector 275, according to a further aspect of the invention, also drives second amplifier means 278 (via link 281); and the output of second amplifier means 278 is then digitized in analog to digital (A/D) converter 279 (also shown in FIG. 2) for use by exposure control logic 280 (to be described hereinafter).

In addition to the detector 275 input, according to a preferred embodiment of the invention, second amplifier means 278 is also fed by the MCP control voltage (the aforementioned first control signal) through crossover network 277, via link 290 as shown in FIG. 2. The function of this circuitry is to maintain the signal to A/D converter 279 at a low level until the MCP gain has been reduced to a value which produces a minimum noise signal. After this MCP control Voltage is reached, second amplifier means 278 output is allowed to trace the detected video level.

This signal (the output of second amplifier means 278 output which is allowed to trace the detected video level) is, according to the invention, digitized (by device 279) and used to control a gating pulse which turns OFF I² Tu be 202 for part of a field.

The length of this gating pulse (also referred to herein as the second control signal which is an output of logic 280 that is placed on link 282) is, according to one embodiment of the invention, altered by logic 280 such that the product of the incident light level, times the resultant exposure time, produces a CCD 204 signal at a constant level which corresponds to A/D converter 279 output at mid scale, as taught in the incorporated Alford et al. reference.

The range of this gating pulse is from 16.7 milliseconds (ON all of the time) to less then 1 microsecond (a>$10^4$× range).

Finally, according to a preferred embodiment of the invention, a light attenuator (assumed for the sake of illustration only to be int egrated into lens 201 as explained hereinbefore) may be switched into the input optical path to further extend the dynamic range of camera system 100 (of FIG. 1) by another factor of $10^4$×. The switching could, for example, be accomplished by using a selenoid to move the light attenuator into the light path (before the I² Tube). The selenoid would be under the control of a third control signal generated by logic 280, output via link 283 shown in FIG. 2. It should be noted that a selenoid switching arrangement is not explicitly illustrated in FIG. 2 since such switching mechanisms are well known by those of ordinary skill in the art.

The digital implementation of the gating control function (explained with reference to devices 278–280 of FIG. 2), allows the electronic control system to be easily combined with the optical attenuator to accomplish the aforementioned $10^4$× dynamic range extension.

Figure 3A:
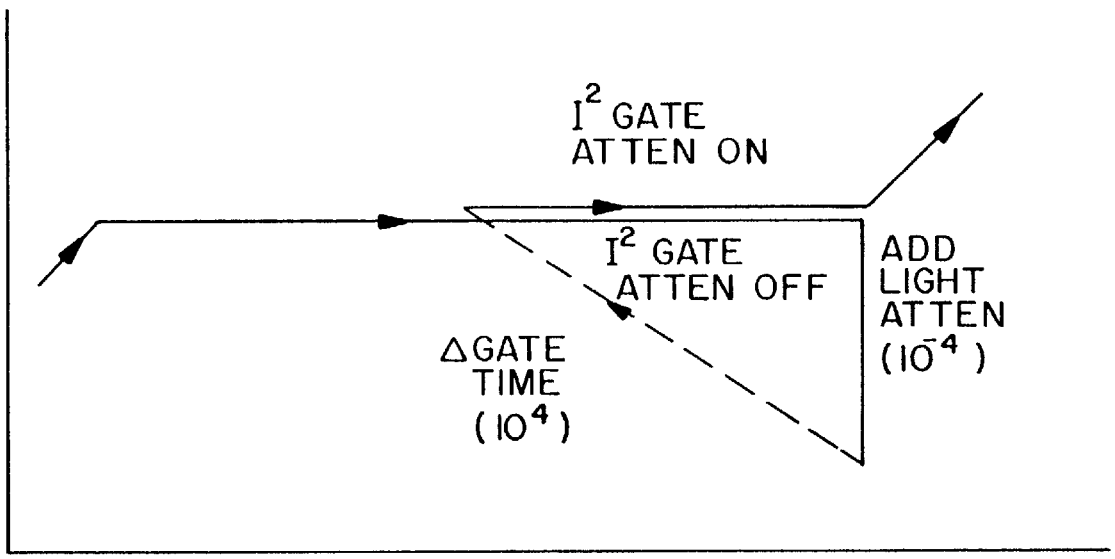
FIGS. 3A and 3B graphically depicts the operation of the gating/attenuator hysterisis features of the system depicted in FIG. 2.
Figure 3B:
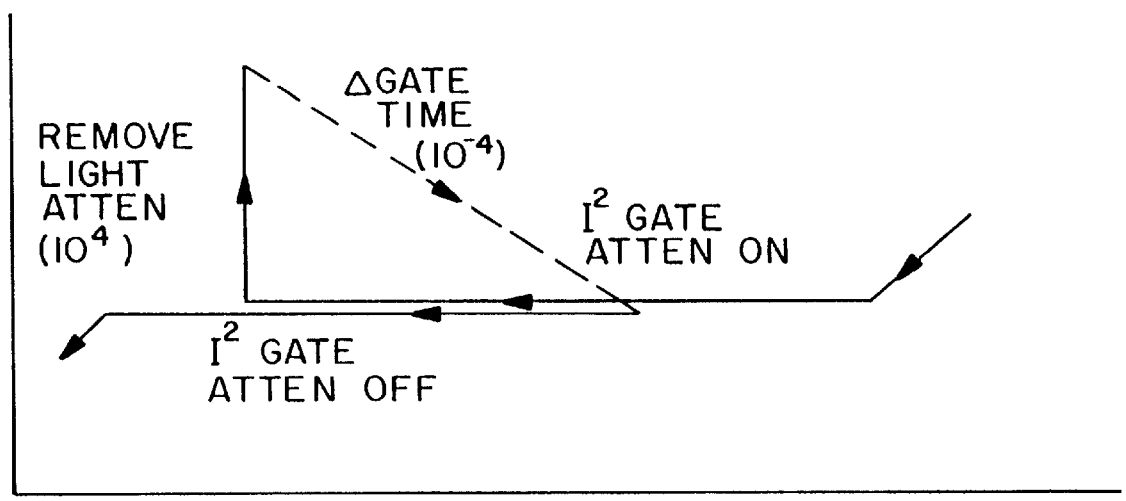

In particular, according to one embodiment of the invention, when the exposure control is at its minimum time, and the signal is still too large, the light attenuator is switched in, and simultaneously the exposure time is increased by $10^4$× to compensate for the resultant loss of light. This criteria for switching may be easily designed by those skilled in the art into logic 280 and by utilizing this technique the very large step change of the light attenuator may be smoothed out. Control system 220 then works normally to control the signal level. The process is reversed if the attenuator is in place and the light level falls. Both of the processes described hereinabove are graphically depicted in FIGS. 3A and 3B which, as indicated hereinbefore, depict the operation of the gating/attenuator hysterisis features of the system depicted in FIG. 2.

Figure 4:
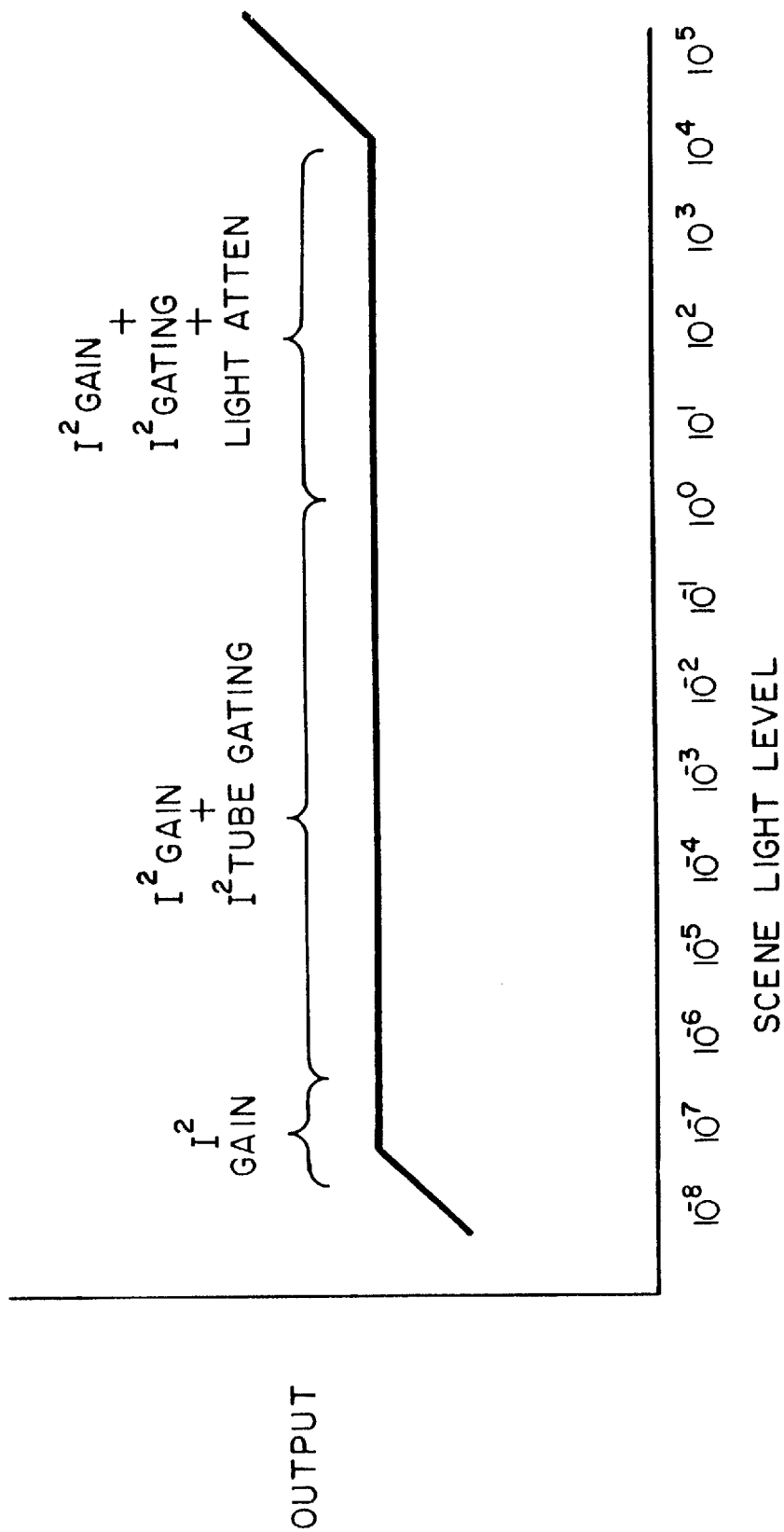
FIG. 4 graphically depicts the operation of the automatic light control features of the system depicted in FIG. 2.

Reference should now be made to FIG. 4 which graphically depicts the operation of the automatic light control features of the system depicted in FIG. 2.

In particular (with reference to FIG. 4), it may be seen that as scene illumination changes from darkness to light, first the gain of the I² Tube is reduced to a level which produces a quiet picture (one in which sparking noise is minimized). Next, the I² Tube's On Time is reduced to shorten the exposure time of the imager. The combination of tube gain change of greater then $10^2$× and an exposure time change of >$10^4$× produces a very wide dynamic range in and of itself. Finally, as may be seen with reference to FIG. 4, the optical attenuator provides a further increase in dynamic range of $10^4$×.

It should be noted and will be appreciated by those skilled in the art that (according to the preferred embodiment of the invention), I² tube gating (as performed by logic 280) can implemented digitally in a manner similar to the digital electronic exposure control for CCD's taught in the incorporated Alford et al. reference because of the ease of synchronizing the pulse with the CCD's charge transfer. If no CCD type shuttering were to be used, a relatively straight forward analog approach to gating control could be utilized.

Furthermore, the technique of controlling the exposure by controlling the Intensifier Tube directly (as opposed to controlling the CCD exposure time) will prolong the life of the tube. The failure mechanism of these devices is associated with the average current, which is held constant by this method.

Finally, the use of video for the exposure level detection instead of the tube current, allows the response of the exposure control loop to be tailored to various applications. That is average, peak, and weighted peak detection can be used. Specific parts of the scene can be emphasized, de-emphasized or ignored totally as they contribute to the desired exposure level.

What has been described in detail hereinabove are methods and apparatus meeting all of the aforestated objectives. As previously indicated, those skilled in the art will recognize that the foregoing description has been presented for the sake of illustration and description only. It is not intended to be exhaustive or to limit the invention to the precise form disclosed, and obviously many modifications and variations are possible in light of the above teaching.

The embodiments and examples set forth herein were presented in order to best explain the principles of the instant invention and its practical application to thereby enable others skilled in the art to best utilize the instant invention in various embodiments and with various modifications as are suited to the particular use contemplated.

It is, therefore, to be understood that the claims appended hereto are intended to cover all such modifications and variations which fall within the true scope and spirit of the invention.

What is claimed is:

1. An image intensifier camera, comprising:

(a) image intensifier means having an adjustable gain;

(b) means for selectively attenuating light input to said camera;

(c) means for focusing the selectively attenuated light input onto said image intensifier means;

(d) image sensor means for integrating light output by said image intensifier means over a predetermined time interval, whereby said image sensor means generates an integrated light output signal; and (e) automatic exposure control means for extending the dynamic range of said camera by controlling the gain of said image intensifier means, selectively gating said image intensifier means on and off, and controlling said means for selectively attenuating light, all in response to said integrated light output signal, wherein to adjust for steadily increasing light from an object under observation, said automatic exposure control means is operative to first adjust the gain of said image intensifier means, then control the gating of said image intensifier means and finally control said means for selectively attenuating light, and to adjust for steadily decreasing light from the object under observation, said automatic exposure control means is operative to first control said means for selectively attenuating light, then control the gating of said image intensifier means and finally adjust the gain of said image intensifier means.

2. Apparatus as set forth in claim 1 wherein said automatic exposure control means further comprises:
   (a) means for measuring the amplitude of said integrated light output signal;
   (b) means for digitizing the measured signal; and
   (c) means for comparing the digitized signal with a predefined setpoint.

3. Apparatus as set forth in claim 2 wherein said means for measuring performs peak measurements.

4. Apparatus as set forth in claim 2 wherein said means for measuring performs average measurements.

5. Apparatus as set forth in claim 2 wherein said means for measuring performs weighted measurements.

6. Apparatus as set forth in claim 2 wherein said means for measuring further comprises a video exposure level output detector.

7. Apparatus as set forth in claim 6 wherein said video exposure level output detector is operative at least in part to emphasize a portion of a scene contributing to exposure level.

8. Apparatus as set forth in claim 6 wherein said video exposure level output detector is operative at least in part to de-emphasize a portion of a scene contributing to exposure level.

9. Apparatus as set forth in claim 6 wherein said video exposure level output detector is operative at least in part to ignore a portion of a scene contributing to exposure level.

10. Apparatus as set forth in claim 1 wherein said image intensifier means is an $I^2$ Tube.

11. Apparatus as set forth in claim 1 wherein said image sensor means is a charge coupled device (CCD).

12. Apparatus as set forth in claim 1 wherein said means for selectively attenuating light further comprises a neutral density filter.

13. Apparatus as set forth in claim 1 wherein said means for focusing further comprises a lens with a neutral density filter integrated therein.

14. An automatic exposure control system for extending the dynamic range of an image intensifier camera, wherein said camera includes image intensifier means having an adjustable gain, means for selectively attenuating light input to said camera, means for focusing the selectively attenuated light input onto said image intensifier means, and image sensor means for integrating light output by said image intensifier means over a predetermined time interval, whereby said image sensor means generates an integrated light output signal, comprising:
   (a) first controller means for controlling the gain of said image intensifier means;
   (b) means for selectively gating said image intensifier means on and off; and
   (c) second controller means for controlling said means for selectively attenuating light, wherein said first controller means, said means for selectively gating and said second controller means are all operated in response to the magnitude of said integrated light output signal, wherein to adjust for steadily increasing light from an object under observation, said automatic exposure control means is operative to first adjust the gain of said image intensifier means, then control the gating of said image intensifier means and finally control said means for selectively attenuating light, and to adjust for steadily decreasing light from the object under observation, said automatic exposure control means is operative to first control said means for selectively attenuating light, then control the gating of said image intensifier means and finally adjust the gain of said image intensifier means.

15. Apparatus as set forth in claim 14 wherein said first controller means further comprises means for measuring the magnitude of said integrated light output signal.

16. Apparatus as set forth in claim 15 wherein said means for measuring performs peak measurements.

17. Apparatus as set forth in claim 15 wherein said means for measuring performs average measurements.

18. Apparatus as set forth in claim 15 wherein said means for measuring performs weighted measurements.

19. Apparatus as set forth in claim 15 wherein said means for measuring further comprises a video exposure level output detector.

20. Apparatus as set forth in claim 19 wherein said video exposure level output detector is operative at least in part to emphasize a portion of a scene contributing to exposure level.

21. Apparatus as set forth in claim 19 wherein said video exposure level output detector is operative at least in part to de-emphasize a portion of a scene contributing to exposure level.

22. Apparatus as set forth in claim 19 wherein said video exposure level output detector is operative at least in part to ignore a portion of a scene contributing to exposure level.

23. Apparatus as set forth in claim 14 wherein said image intensifier means is an $I^2$ Tube.

24. Apparatus as set forth in claim 14 wherein said image sensor means is a charge coupled device (CCD).

25. Apparatus as set forth in claim 14 wherein said means for selectively attenuating light further comprises a neutral density filter.

26. Apparatus as set forth in claim 14 wherein said means for focusing further comprises a lens with a neutral density filter integrated therein.

27. An image intensifier camera, comprising:
   (a) an image intensifier tube ($I^2$ Tube) having an adjustable gain which may be varied by adjusting Micro Channel Plate (MCP) voltage of the $I^2$ Tube;
   (b) means for selectively attenuating light input to said camera;
   (c) means for focusing the selectively attenuated light input onto said $I^2$ Tube;
   (d) image sensor means for integrating light output by said $I^2$ Tube over a predetermined time interval, whereby said image sensor means generates an integrated light output signal; and
   (e) automatic exposure control means for extending the dynamic range of said camera by adjusting said Micro Channel Plate (MCP) voltage to thereby control the gain of said $I^2$ Tube, selectively gating said $I^2$ Tube on and off, and controlling said means for selectively attenuating light, all in response to the amplitude of said integrated light output signal, wherein to adjust for steadily increasing light from an object under observation, said automatic exposure control means is operative to first adjust the gain of said image intensifier means, then control the gating of said image intensifier means and finally control said means for selectively attenuating light, and to adjust for steadily decreasing light from the object under observation, said automatic exposure control means is operative to first control said means for selectively attenuating light, then control the gating of said image intensifier means and finally adjust the gain of said image intensifier means.

28. Apparatus as set forth in claim 27 wherein said automatic exposure control means further comprises:
   (a) means for generating a first control signal that controls the gain of the $I^2$ Tube;
   (b) means for generating a second control signal for selectively gating the $I^2$ Tube on or off; and
   (c) means for generating a third control signal for controlling said means for selectively attenuating light.

29. Apparatus as set forth in claim 28 wherein said means for generating a first control signal that controls the gain of said $I^2$ Tube further comprises:
   (a) video exposure level output detector means for measuring the amplitude of said integrated light output signal and generating a DC output value corresponding thereto; and
   (b) first amplifier means, coupled to said detector, for amplifying the difference between the DC output value of said detector and a predefined reference value to thereby generate said first control signal.

30. Apparatus as set forth in claim 29 wherein said means for generating a second control signal for selectively gating the $I^2$ Tube on or off further comprises:
   (a) second amplifier means, coupled to the output of said detector, for receiving as a first input the DC output value of said detector;
   (b) means for providing said first control signal as a second input to said second amplifier means, in order to maintain the output of said second amplifier means at a low level until the MCP gain has been reduced to a value which produces a minimum noise signal, after which said second amplifier means output is allowed to trace the detected video level; and
   (c) exposure control logic means, including analog to digital (A/D) converter means for digitizing the output of said second amplifier means to produce a gating pulse which turns OFF the tube for part of a field, coupled to the output of said second amplifier means, wherein the length of said gating pulse is altered by said logic means.

31. Apparatus as set forth in claim 30 wherein the length of said gating pulse is altered by said logic means such that the product of the incident light level, times the resultant exposure time produces a CCD signal at a constant level which corresponds to the A/D output at mid scale.

32. Apparatus as set forth in claim 30 wherein said means for providing is a crossover network.

33. Apparatus as set forth in claim 28 wherein said means for generating a third control signal for controlling said means for attenuating light comprises light attenuator switch activation means.

34. An automatic exposure control system for extending the dynamic range of an image intensifier camera, wherein said camera includes an image intensifier tube ($I^2$ Tube) having an adjustable gain which may be varied by adjusting Micro Channel Plate (MCP) voltage of the $I^2$ Tube, means for selectively attenuating light input to said camera, means for focusing the selectively attenuated light input onto said $I^2$ Tube, and image sensor means for integrating light output by said $I^2$ Tube over a predetermined time interval, whereby said image sensor means generates an integrated light output signal, comprising:
   (a) means for generating a first control signal that controls the gain of the $I^2$ Tube;
   (b) means for generating a second control signal for selectively gating the $I^2$ Tube on or off; and
   (c) means for generating a third control signal for controlling said means for selectively attenuating light, wherein to adjust for steadily increasing light from an object under observation, said automatic exposure control means is operative to first adjust the gain of said image intensifier means, then control the gating of said image intensifier means and finally control said means for selectively attenuating light, and to adjust for steadily decreasing light from the object under observation, said automatic exposure control means is operative to first control said means for selectively attenuating light, then control the gating of said image intensifier means and finally adjust the gain of said image intensifier means.

35. Apparatus as set forth in claim 34 wherein said means for generating a first control signal that controls the gain of said $I^2$ Tube further comprises:
   (a) video exposure level output detector means for measuring the amplitude of said integrated light output signal and generating a DC output value corresponding thereto; and
   (b) first amplifier means, coupled to said detector, for amplifying the difference between the DC output value of said detector and a predefined reference value to thereby generate said first control signal.

36. Apparatus as set forth in claim 35 wherein said means for generating a second control signal for selectively gating the $I^2$ Tube on or off further comprises:
   (a) second amplifier means, coupled to the output of said detector, for receiving as a first input the DC output value of said detector;
   (b) means for providing said first control signal as a second input to said second amplifier means, in order to maintain the output of said second amplifier means at a low level until the MCP gain has been reduced to a value which produces a minimum noise signal, after which said second amplifier means output is allowed to trace the detected video level; and
   (c) exposure control logic means, including analog to digital (A/D) converter means for digitizing the output of said second amplifier means to produce a gating pulse which turns OFF the tube for part of a field, coupled to the output of said second amplifier means, wherein the length of said gating pulse is altered by said logic means.

37. Apparatus as set forth in claim 36 wherein the length of said gating pulse is altered by said logic means such that the product of the incident light level, times the resultant exposure time produces a CCD signal at a constant level which corresponds to the A/D output at mid scale.

38. Apparatus as set forth in claim 36 wherein said means for providing is a crossover network.

39. Apparatus as set forth in claim 34 wherein said means for generating a third control signal for controlling said means for attenuating light comprises light attenuator switch activation means.

40. A method for extending the dynamic range of an image intensifier camera, wherein said camera includes image intensifier means having an adjustable gain, means for selectively attenuating light inputs to said camera, means for focusing the selectively attenuated light input onto said image intensifier means automatic exposure control means, and image sensor means for integrating light output by said image intensifier means over a predetermined time interval, whereby said image sensor means generates an integrated light output signal, comprising the steps of:

(a) controlling the gain of said image intensifier means utilizing first controller means;

(b) selectively gating said image intensifier means on and off; and (c) controlling said means for selectively attenuating light utilizing second controller means wherein said first controller means, said means for selectively gating and said second controller means are all operated in response to the magnitude of said integrated light output signal, wherein to adjust for steadily increasing light from an object under observation, said automatic exposure control means is operative to first adjust the gain of said image intensifier means, then control the gating of said image intensifier means and finally control said means for selectively attenuating light, and to adjust for steadily decreasing light from the object under observation, said automatic exposure control means is operative to first control said means for selectively attenuating light, then control the gating of said image intensifier means and finally adjust the gain of said image intensifier means.

41. A method as set forth in claim 40 wherein said step of controlling the gain of said image intensifier means further comprises the step of measuring the magnitude of said integrated light output signal.

42. A method as set forth in claim 41 wherein said step of measuring is performed by taking peak measurements.

43. A method as set forth in claim 41 wherein said step of measuring is performed by taking average measurements.

44. A method as set forth in claim 41 wherein said step of measuring is performed by taking weighted measurements.

* * * * *